| United States Patent [19] | [11] Patent Number: 4,956,021 |
| --- | --- |
| Kerze | [45] Date of Patent: Sep. 11, 1990 |

[54] STAIN CLEANING METHOD

[76] Inventor: Joseph E. Kerze, 17446 Hatteras St., Encino, Calif. 91316

[21] Appl. No.: 475,447

[22] Filed: Feb. 6, 1990

[51] Int. Cl.$^5$ .............................................. B08B 7/04
[52] U.S. Cl. ........................................ 134/40; 134/6; 134/26
[58] Field of Search ........................ 134/6, 26, 40, 42

[56] References Cited

U.S. PATENT DOCUMENTS

| 3,149,364 | 9/1964 | Baptist | 134/6 |
| 3,822,213 | 7/1974 | Johnson | 134/60 |
| 4,207,193 | 6/1980 | Ford | 134/60 |

Primary Examiner—Asok Pal
Assistant Examiner—Ourmazd Ojan
Attorney, Agent, or Firm—Sanford Astor

[57] ABSTRACT

The invention involves a method and compositions for cleaning all oily, natural or synthetic stains or residue from any stone surface, natural or man-made. The method comprises surrounding the stain with a container which is open at the bottom, pouring in a solvent material, covering the container with an airtight lid to prevent evaporation and allowing the solvent to remain on the stain for from 1 to 24 hours. Thereafter the lid is removed and an adsorbent powder is added to the container to the top of the absorbent liquid. The absorbent powder is allowed to stand for 1 to 24 hours and then the powder is removed and the surface being cleaned is allowed to air dry for 24 hours.

10 Claims, No Drawings

STAIN CLEANING METHOD

BACKGROUND OF THE INVENTION

There are numerous materials today for construction of various buildings and in addition materials used inside of buildings such as marble, brick, concrete, etc. which are used for kitchen counters, bathroom counters, floors, etc. Numerous materials which contain natural oils or synthetic oils of various kinds, if they are allowed to remain in contact with the surface, can stain the surface of the marble, concrete, etc., causing unattractive stain marks. Examples of those substances that often stain the surfaces include plumber's putty, which may stain the surface of marble or tile around kitchen or bathroom fixtures, bacon grease, cooking oil, silicons, lubricants, or things such as make-up.

It has proven very difficult to remove these stains from from tile, marble, concrete, etc. Abrasive cleaning often ruins the surface of the material.

OBJECTS OF THE INVENTION

It is an object of the present invention to provide a method and compositions for removing oily stains from a variety of hard construction materials.

It is a further object of the invention to provide a method for cleaning the stains from the construction surfaces which does not injure the surface in any manner.

Yet a further object of the invention is to provide a simple, inexpensive and efficient method for the cleaning of solid surfaces.

DESCRIPTION OF THE INVENTION

These objects are accomplished in accordance with the invention by a method where there is first applied to the surface to be cleaned, a solvent material. Various methods can be used to apply the solvent material to the surface. The most convenient is usually to place over the stain a container open at the bottom, such as a plastic cylinder, which is slightly larger than the stain. The solvent is then poured into the container directly or an absorbant material such as a sponge can be placed inside the ring and the solvent poured into the container in an amount to saturate the absorbant material. A cover is then placed over the container in order to prevent evaporation of the solvent material.

The solvent material is allowed to remain in contact with the stain on the surface for anywhere from 1 to 24 hours, depending on the depth and nature of the stain. At the end of the time period at which the solvent is allowed to remain on the stain, the cover of the container is removed, the absorbant material is removed and an absorbant powder is placed in the container in a sufficient depth to cover any remaining solvent in the container. The lid to the container does not necessarily have to be replaced back after the absorbant material has been added, however it is suggested to do so to contain any fumes that still remain from the solvent material.

The absorbant powder is allowed to remain in the container on the stain for anywhere from 1 to 24 hours and then the powder is removed. The stain is allowed to air dry for 24 hours to be observed. If the stain is not completely removed, the process can be repeated.

This method has been effective to remove bacon grease, cooking oil, silicons, lubricants and make-up from tile and marble surfaces. Any substance of an oily nature can be removed, including motor oil stains from concrete. This often occurs on the floor of garages. The method is also effective to remove smog residue from stone.

The solvent material which may be utilized in the present invention includes any organic chemical or mixtures thereof which are completely miscible in all proportions with petroleum hydrocarbons containing 10 to 20 carbon atoms per molecule and which are liquid at ambient temperature and pressure. This would include all aromatic hydrocarbons or mixtures thereof having a molecular weight of 78 to 130. It also includes all hydrocarbons, both aromatic, aliphatic, or alicyclic, or mixtures thereof, which boil at atmospheric pressure between 40° C. to 140° C. This would also include halogenated hydrocarbons, both aromatic and aliphatic, having a boiling range between 40° C. and 140° C. The solvent may also include organic liquids which contain oxygen as part of their chemical structure, such as an alcohol or an ether, which have a boiling point between 40° C. and the 140° C., and which are completely miscible in all proportions with liquid petroleum hydrocarbons containing 10 to 20 carbon atoms per molecule. Examples of chemicals which may be used for the solvent material include benzene, toluene, tetrachlorethane, xylene, dioxane or butyl acetate. Acids or amines should not be used since they may damage the surface.

The absorbant material used in the second stage of the cleaning method is a finely divided organic or inorganic solid absorbant material which does not dissolve in the organic solvent. Certain organic powders can be utilized, such as starch or powdered sugar, however, usually an inorganic solid is used, such as anhydrous calcium sulfate, aluminum oxide or silicon dioxide. Any inorganic solid having a mean surface area less than 100 microns can be utilized. The surface area can be from about one-half (½) to about fifty (50) square meters per gram.

Often, in cleaning the stains of the type described, the stain surrounds a hole, such as where a bathroom fixture had previously been installed and the stains are caused by plumber's putty. In effecting the treatment hereunder, it is necessary to seal the hole in some manner such as by placing over the hole a sheet of aluminum foil and sealing it with a product such as silicon.

In an actual cleaning process which was conducted, a marble bathroom top which contained a sink was cleaned as follows: the fixtures for the hot and cold faucets and the water delivery system were removed which revealed stains around each of the holes for the fixtures caused by plumber's putty used when the fixtures were originally installed. The holes were sealed with aluminum foil and silicon and allowed to cure for 24 hours in order to obtain a fixed seal of the holes. A ring of pliable plastic tubing was placed around the stain at a circumference slightly bigger than the stain. An absorbant material consisting of 8 layers of paper towels was cut to the size of the stain but smaller than the plastic ring. The absorbant material was placed on the marble surface inside the ring. Toluene was applied to the absorbant material to a 100% saturation level. A piece of aluminum foil, larger than the plastic ring, was placed over the absorbant material. A flat weight was placed on top of the plastic ring sealing the foil and the absorbant material to the marble surface. This was allowed to stand for 24 hours.

After 24 hours the weight was removed, then the plastic ring, then the foil and then the absorbant material. At this point, the ring was returned and a powdery absorbant material comprising calcium sulfate hemihydrate, also known as plaster of paris, was placed over the entire stain to a depth of approximately 1 inch. The powder was then covered with another piece of aluminum foil and a cover in order to contain any fumes left from the solvent material The powder was allowed to stand for 24 hours and then the cover, the powder and the ring were removed and the marble was allowed to air dry for 24 hours.

In this particular instance, a slight bit of the stain remained after the first treatment, and the treatment was exactly repeated a second time at which time all of the stain from the marble top was removed.

While the invention has been described with reference to certain specific embodiments, various changes in modifications may be made within the scope of the invention in its broadest scope.

I claim:

1. A method for cleaning hydrocarbon stains from a hard surface comprising surrounding the stain on the surface with means to contain a liquid solvent, filling said containing means with an organic chemical solvent which is completely miscible with petroleum hydrocarbons which are liquid at ambient temperature and pressure, allowing the solvent to remain on the surface for a period of from 1 to 24 hours, removing the solvent and placing on the surface an absorbant material which does not dissolve in the solvent, allowing the absorbant material to remain on the surface from 1 to 24 hours, then removing the absorbant material and allowing the surface to air dry.

2. The method of claim 1 in which said solvent is an organic compound or mixtures thereof which boil at atmospheric pressure between 40° C. to 140° C.

3. The method of claim 1 in which said solvent is a member from the group consisting of benzene, toluene, tetrachlorethane, xylene, dioxane and butyl acetate.

4. The method claim 1 in which said absorbant material is a finely divided, inorganic, water insoluble material.

5. The method of claim 4 in which said absorbant material has a mean particle size less than 100 microns.

6. The method of claim 4 in which the surface area of said absorbant material is from about one-half (1/2) to about 50 square meters per gram.

7. The method of claim 4 in which said absorbant material is a member from the group consisting of calcium sulfate, aluminum oxide and silicon dioxide.

8. The method of claim 1 in which the means to contain said solvent comprises a cylinder open at the top and bottom.

9. The method of claim 1 in which said solvent is held on said surface by a saturated absorbant material.

10. The method of claim 9 in which said absorbant material is a sponge.

* * * * *